United States Patent [19]

Cord et al.

[11] Patent Number: 5,627,990

[45] Date of Patent: May 6, 1997

[54] MANAGEMENT SYSTEM FOR A HIERARCHICAL DATA CACHE EMPLOYING PREEMPTIVE CACHE TRACK DEMOTION AND RESTAGING TO ADAPT TO ACCESS PATTERNS

[75] Inventors: Joel H. Cord; Michael H. Hartung; Joseph S. Hyde; Vernon J. Legvold; William G. Sherman, all of Tucson, Ariz.

[73] Assignee: International Business Machines Corporation, Armonk, N.Y.

[21] Appl. No.: 597,719

[22] Filed: Feb. 7, 1996

Related U.S. Application Data

[63] Continuation of Ser. No. 262,096, Jun. 20, 1994, abandoned.

[51] Int. Cl.[6] ................................................ G06F 12/08
[52] U.S. Cl. ...................... 395/449; 395/440; 395/463; 395/465
[58] Field of Search ....................... 395/439, 440, 395/449, 451, 463, 460, 465, 472, 486, 487

[56] References Cited

U.S. PATENT DOCUMENTS

| | | | |
|---|---|---|---|
| 4,322,795 | 3/1982 | Lange et al. | 395/463 |
| 4,394,732 | 7/1983 | Swenson | 395/440 |
| 4,442,487 | 4/1984 | Fletcher et al. | 395/449 |
| 4,471,429 | 9/1984 | Porter et al. | 395/471 |
| 4,571,674 | 2/1986 | Hartung | 395/250 |
| 4,574,346 | 3/1986 | Hartung | 395/444 |
| 4,719,568 | 1/1988 | Carrubba et al. | 395/450 |
| 4,792,898 | 12/1988 | McCarthy et al. | 395/445 |
| 4,851,993 | 7/1989 | Chen et al. | 395/250 |
| 4,882,642 | 11/1989 | Tayler et al. | 360/78.11 |
| 4,885,680 | 12/1989 | Anthony et al. | 395/471 |
| 5,130,922 | 7/1992 | Liu | 395/471 |
| 5,155,835 | 10/1992 | Belsan | 395/441 |
| 5,257,370 | 10/1993 | Letwin | 395/650 |
| 5,261,066 | 11/1993 | Jouppi et al. | 395/449 |
| 5,293,608 | 3/1994 | Johnson et al. | 395/463 |
| 5,386,547 | 1/1995 | Jouppi | 395/449 |

OTHER PUBLICATIONS

Lim et al. "Direct Access Storage Device (DASD) Modeling and Validation", 1988, pp. 1024–1029.

*Primary Examiner*—Parshotam S. Lall
*Assistant Examiner*—Viet Vu
*Attorney, Agent, or Firm*—Baker, Maxham, Jester & Meador

[57] ABSTRACT

An adaptive hierarchical cache management system for improving effective cache hit ratios by eliminating unnecessary duplicate cache entries in two coupled cache memories. When a cached Storage Controller (SC) is coupled to a Cached Storage Drawer (CSD), the hierarchical coupling of the SC cache memory and CSD cache memory unnecessarily duplicates cache entries during normal operation. A Conditional Purge procedure purges duplicate lines from the CSD cache subject to a DASD activity threshold. A Prenotify Intent parameter allows the SC to request restaging of the purged cache entry preparatory to fast write or LRU demotion in the SC cache. The new procedures substantially and transparently improve the combined caching efficiency without significant new hardware or software overhead.

17 Claims, 9 Drawing Sheets

MANAGEMENT SYSTEM FOR A HIERARCHICAL DATA CACHE EMPLOYING PREEMPTIVE CACHE TRACK DEMOTION AND RESTAGING TO ADAPT TO ACCESS PATTERNS

This application is a continuation of application Ser. No. 08/262,096, filed Jun. 20, 1994, now abandoned.

BACKGROUND OF THE INVENTION

1. Field of the Invention

This invention relates generally to hierarchical caching of data and particularly to selective purging of duplicate cache entries for Direct Access Storage Device (DASD) subsystems.

2. Description of the Related Art

Modern high-performance data processors use a private high-speed hardware-managed buffer memory in front of the main data store to reduce average memory access delay at the Central Processing Unit (CPU). This high-speed buffer is denominated a "cache" because it is usually transparent to the applications programmer. Because hardware speed is generally directly proportional to hardware cost, the cached memory features can be cost-effectively improved by adding another faster cache in front of the first cache if made smaller. Such multilevel cache "hierarchies" are known in the art to give rise to a requirement for "coherence management" in shared memory multiprocessing configurations because each CPU is directly coupled only to its private cache. That is, the temporary contents of many separate private cache buffers must be somehow coordinated to ensure that only the most recent record copies are committed to the underlying main data store.

An analogous problem arises in systems that employ multilevel data storage subsystems. For instance, a modern shared-storage multiprocessing system may include a plurality of host processors coupled through several cache buffer levels to a hierarchical data store that includes a random access memory level followed by one or more larger, slower storage levels such as Direct Access Storage Device (DASD) and tape library subsystems. Transfer of data up and down such a multilevel shared-storage hierarchy requires data transfer controllers at each level to optimize overall transfer efficiency.

The IBM 3990 storage controller is an example of a storage controller used to control data transfer between DASD-based storage libraries and host computer processors. This storage controller includes a local cache memory for buffering data transfers to and from the underlying DASD storage subsystem. The IBM 3990 storage control subsystem is fully described in "IBM 3990 Storage Control Planning, Installation and Storage Administration Guide" (IBM document GA32-0100-04, International Business Machines Corporation, copyright 1991) and in "IBM 3990 Storage Control Introduction" (IBM document GA32-0098-0, International Business Machines Corporation, copyright 1987). Both of these documents are fully incorporated herein by this reference.

A typical (IBM 3990 Model 3) storage controller handles up to 16 channels from host computers and up to 64 logical DASDs. Within the storage controller are two multipath storage directors and four storage paths, two of which are associated with each multipath storage director. Each multipath storage director may be connected to up to eight incoming channels from host computers, for a total of 16 channels. Thus, each multipath storage director functions as an eight-by-two switch.

Recent advances in DASD storage library art include exploitation of the Redundant Arrays of Inexpensive Disks (RAID) technology now well-known in the art. RAID DASD technology has led to development of a DASD storage system rack incorporating a plurality of cached DASD modules each organized to emulate logical DASD storage volumes. Each module includes a high-speed cache buffer memory for facilitating data transfers between a specific plurality of DASDs and a channel to the adjacent storage controller. Such a module is herein denominated a Cached Storage Drawer (CSD) subsystem.

As is known in the art, channels are physical links between a host computer processor and an external device, such as a DASD data storage subsystem. Usually, a host computer has a small number of channels, each physically connected to channel control multiplexers such as the IBM 3990 storage controller. For instance, several host computer processors may be connected to one IBM 3990-3 storage controller, which in turn is connected to sixty-four DASD volumes. When transferring data, the storage controller can secure any one of the plurality of channels and storage paths back to the host computer and forward to the DASD to establish a temporary input/output transaction data path. It is a feature of the IBM 3990 storage controller that such a data path between a host computer and a DASD subsystem may be severed into two separate connection intervals, each of which may be handled over a different physical channel and storage path. That is, a DASD access request need not be answered over the same channel on which it is received. This feature increases storage controller efficiency because the storage controller is free to handle other tasks during the disconnect interval between request and response.

The independent development of a new CSD RAID type of DASD subsystem and a distributed host processor storage controller has given rise to a new variation of the cache hierarchy architecture known in the art. The IBM 3990 type of storage controller provides a cache buffer memory to support data transfer between host computer and DASD-based storage subsystem. The CSD subsystem provides internal cache buffer memory to support data transfers in and out of the RAID plurality of DASDs. Thus, connecting the IBM 3990 type of storage controller to a CSD storage system creates an unplanned dual-cache hierarchy comprising the storage controller cache and the CSD cache. Each of these two cache memories is independently managed for different purposes, including the aging and demotion of cache entries according to a Least Recently Used (LRU) priority scheme and the like. This unplanned duplication presents novel problems and opportunities heretofore unknown in the hierarchical cache art.

Cache memory is best known for its application as an adjunct to random-access memory (RAM) where the cache buffer provides high-speed storage for frequently-used instructions and data. Practitioners in the art have proposed many important improvements to multiple-cache hierarchies employed in distributed multi-processor systems. The fundamental distributed system cache management problem is to optimize the tension between minimizing cross-interrogation overhead and maximizing cache coherency. Processor time is required to cross-interrogate individual caches when searching for duplicate copies of cache data blocks to ensure that all copies but the latest are flushed from every cache. This cleaning operation provides cache "coherency", which exists when each of the plurality of host processors has access only to the latest version of a cached data line or block. The struggle for coherency in distributed systems invites increased cross-interrogation processor overhead and many practitioners have proposed improvements to reduce cross-interrogation without reducing coherency.

For instance, in U.S. Pat. No. 4,574,346, Hartung proposes marking cache data lines for retention or discard depending on whether the data line has a "transient" status or "permanent" status. Transient data lines exist only temporarily and are never transferred to storage levels underlying cache. This arrangement eliminates cross-interrogation overhead for the "transient" data lines. Similarly, in U.S. Pat. No. 4,885,680, Anthony et al. propose marking data that is temporarily cachable to facilitate the efficient management of that data in cache. When an "invalidate marked data" instruction is received, the cache controls sweep through the entire cache directory and invalidate all marked cache lines in a single pass, thereby eliminating the usual cache coherency overhead.

Similarly, in U.S. Pat. No. 5,130,922, Liu proposes adding status bits in the cache directory so that cache "exclusive" status (which locks the cache entry for a single processor) can be anticipated without incurring performance penalties when the exclusive assignment is inappropriate.

In U.S. Pat. No. 4,442,487, Fletcher et al. add two flags to the directory entry that serve to communicate from main memory to private and shared caches how the given page of data is to be used. Essentially, pages that can be both written and shared are moved from main memory to a shared level-two cache and therefrom to a shared level-one cache, with the host processors executing only from the shared level-one cache. All other pages are moved from main memory to private level-two and level-one caches for the requesting processor. Thus, Fletcher et al. permit a processor to execute from either its private cache or the shared level-one cache, thereby allowing several processors to share an underlying main memory without encountering cross-interrogation overhead. The cost of this feature is voluminous cache space.

In U.S. Pat. No. 4,471,429, Porter et al. disclose a cache clearing system that uses a duplicate directory to reflect the contents of the cache directory within its associated cache unit. Commands affecting information segments within the main memory are transferred by the system controller unit to each of the duplicate directories to determine if the affected information segment is stored in the associated cache memory and, if so, the duplicate directory issues a "clear" command through the system controller to clear the information segment from the associated cache unit, thereby improving cache flushing efficiency.

Also, in U.S. Pat. No. 4,322,795, Lange et al. disclose a similar duplicate directory arrangement for selective clearing of the cache in multiprocessor systems where data in a cache becomes obsolete because of changes made to the corresponding data in main memory by another processor. Lange et al. teach a LRU scheme for selecting a storage location for data retrieved from main memory responsive to a cache miss. This scheme provides a higher cache hit ratio, thereby improving flushing efficiency available from the duplicate directory arrangement.

It is clear from these references that the present art focuses primarily on the multiple independent cache coherency problem and neither teaches nor suggests schemes for exploiting two independently-managed high-speed cache buffer memories that are hierarchically connected. When a CSD data storage library subsystem is coupled to a plurality of distributed host processors through one or more cached storage controllers, there is a clearly-felt need in the art for a hierarchical cache management technique that offers improved caching efficiency through reduced duplication of cached data blocks. The related unresolved deficiencies are clearly felt in the art and are solved by this invention in the manner described below.

SUMMARY OF THE INVENTION

This invention reduces the unnecessary duplication of data in the lower Cached Storage Drawer (CSD) subsystem and the upper Storage Controller (SC) cache, thereby permitting a higher effective cache hit ratio that results in higher overall storage subsystem performance. This is accomplished by adding two new parameters to the SC request for CSD access, herein denominated the "Set Domain Request". The first parameter is the "Pre-notify Intent" parameter, which instructs the CSD to stage a specified domain (one or more contiguous tracks) into the CSD cache from the DASDs without interrupting SC to acknowledge completion of the request. The second of these parameters is the "Conditional Purge" which instructs the CSD to demote the specified domain to the least LRU priority for the CSD cache "Free-list" provided that the physical activity of the associated DASDs is below a predetermined threshold. If DASD activity is too high, the domain demotion is ignored and instead the domain is assigned the usual Most Recently Used (MRU) position at the top of the Least Recently Used (LRU) list maintained for the CSD cache.

Thus, a duplicate cache track is purged (by Conditional Purge mode) from the lower CSD cache, provided that the hardware activity level is not too high, and later restaged (by Pre-notify Intent mode) in anticipation of destaging or demotion of the upper SC cache copy of the same track. Also, for any access to the CSD by the SC, whether with read or write intent, if the requested data is already in the CSD cache, the connection is maintained for immediate data transfer without the usual disconnection to await a ready signal from CSD.

It is an object of the system of this invention to increase storage subsystem performance by reducing data duplication in combined cache memory to increase effective cache memory hit ratios. It is a feature of the system of this invention that the conditional purging procedure adapts to the activity level of the DASD hardware, thereby minimizing unwelcome hardware activity arising from the cache optimization procedure of this invention.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
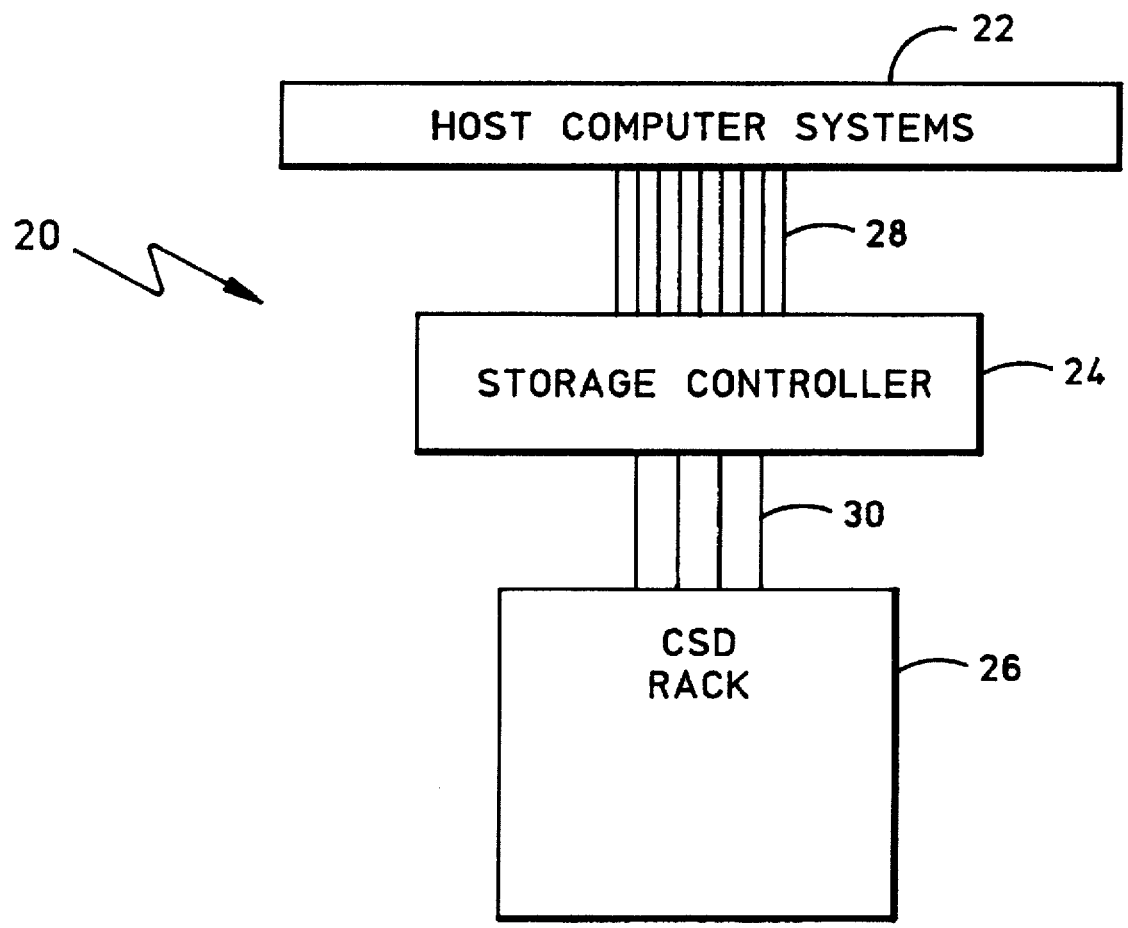
FIG. 1 is a functional block diagram of a distributed data processing system suitable for implementation of the system of this invention.

FIG. 1 shows a simplified functional block diagram of a large distributed host data processing system 20. The specific elements of system 20 pertaining to this disclosure are the plurality of host computer systems 22, the storage controller (SC) 24, and a storage library rack 26, which consists of a plurality of Cached Storage Drawers (CSDs) one of which is further described below in connection with FIGS. 4–5. Storage controller 24 is herein preferably an IBM 3990 Model 3 type controller, which is described in detail in the above cited IBM documents. The host computers in plurality 22 are each typically mainframe systems such as the IBM 3090, the ES9000 Model computer or comparable systems known in the art. Host computer plurality 22 is coupled to storage controller 24 by a plurality of data channels exemplified by host channel 28. Channel 28 may be configured to transfer data serially or in parallel. Storage controller 24 is coupled to rack 26 by means of four data paths exemplified by data path 30.

Figure 2:
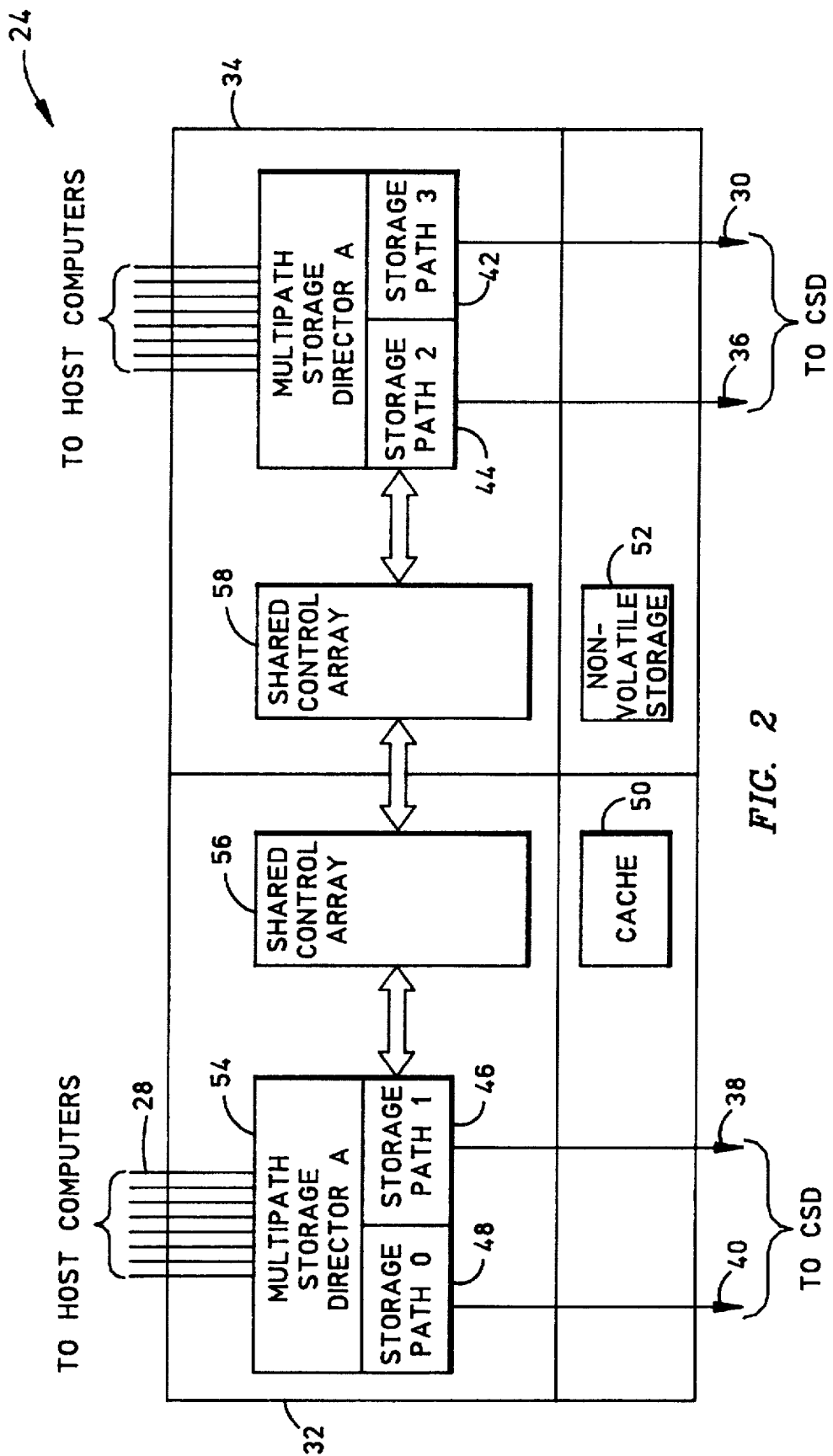
FIG. 2 is a functional block diagram of a Storage Controller (SC) from the system of FIG. 1.

FIG. 2 shows storage controller 24 in more detail. Storage controller 24 includes two storage clusters 32 and 34, each of which provides for selective connection between a host computer and a logical DASD. Both storage clusters 32 and 34 are coupled to some or all of the host computer plurality 22 through host channels exemplified by host channel 28. Thus, every host computer system has access to any of the logical DASDs for storage and retrieval of data. When a single host computer is connected by at least two host channels, one each is connected to storage clusters 32 and 34. Similarly, where four channels are provided, two are connected to storage cluster 32 and two are connected to storage cluster 34. Storage controller 24 may receive a request from a host computer over one host channel and respond to the request over the same or any other one of the host channels connected to the same host computer. That is, storage controller 24 need not respond on the same physical channel through which a request is received. The host channels associated with one host computer are herein denominated a "path group", knowledge of which is transferred from host computer system 22 to storage controller 24.

The four data paths 30, 36, 38 and 40 couple storage controller 24 to CSD rack 26. Each data path 30, 36–40 is associated with a single dedicated storage path processor 42–48, respectively. Each data path 30, 36–40 is coupled to all logical storage elements of CSD rack 26 but only one such data path has access to a particular logical store at any instant. Because storage controller 24 operates to synchronize disconnects and reconnects between storage devices and host computers based on the rotational position of a DASD disk, storage controller 24 may be viewed essentially as a data transfer traffic manager. Such traffic management scheme must respond as quickly as possible to addressed data requests received over the host channels, so storage controller 24 is organized to keep storage path processors 42–48 fully occupied with data moving between host computer system 22 and CSD rack 26.

In addition to storage clusters 32 and 34, storage controller 24 includes a controller cache memory (CCM) 50 and a nonvolatile store 52. CCM 50 provides storage for frequently accessed data and buffering to provide balanced response times for cache writes and cache reads. Nonvolatile store 52 provides temporary storage of data being written to CCM 50 until destaged to permanent storage in CSD rack 26. Commitment to storage in nonvolatile store 52 enables storage controller 24 to assure host computer system 22 that an addressed data write request is logically complete even though actual destaging to permanent storage media is still pending.

Storage clusters 32 and 34 provide identical functional features, which are now described in connection with storage cluster 32 alone. Storage cluster 32 includes a multipath storage director 54 that operates as a four or eight by two switch between the host channels and signal path processors 46–48. Storage cluster 32 also includes a shared control array 56 that duplicates the contents of the shared control array 58 in storage cluster 34. Shared control arrays 56–58 store path group information and control blocks for the logical DASDs in CSD rack 26 and may also include some of the data structures used to control CCM 50 and to practice the method of this invention as described below. Such data structures may also be stored in CCM 50.

Figure 3:
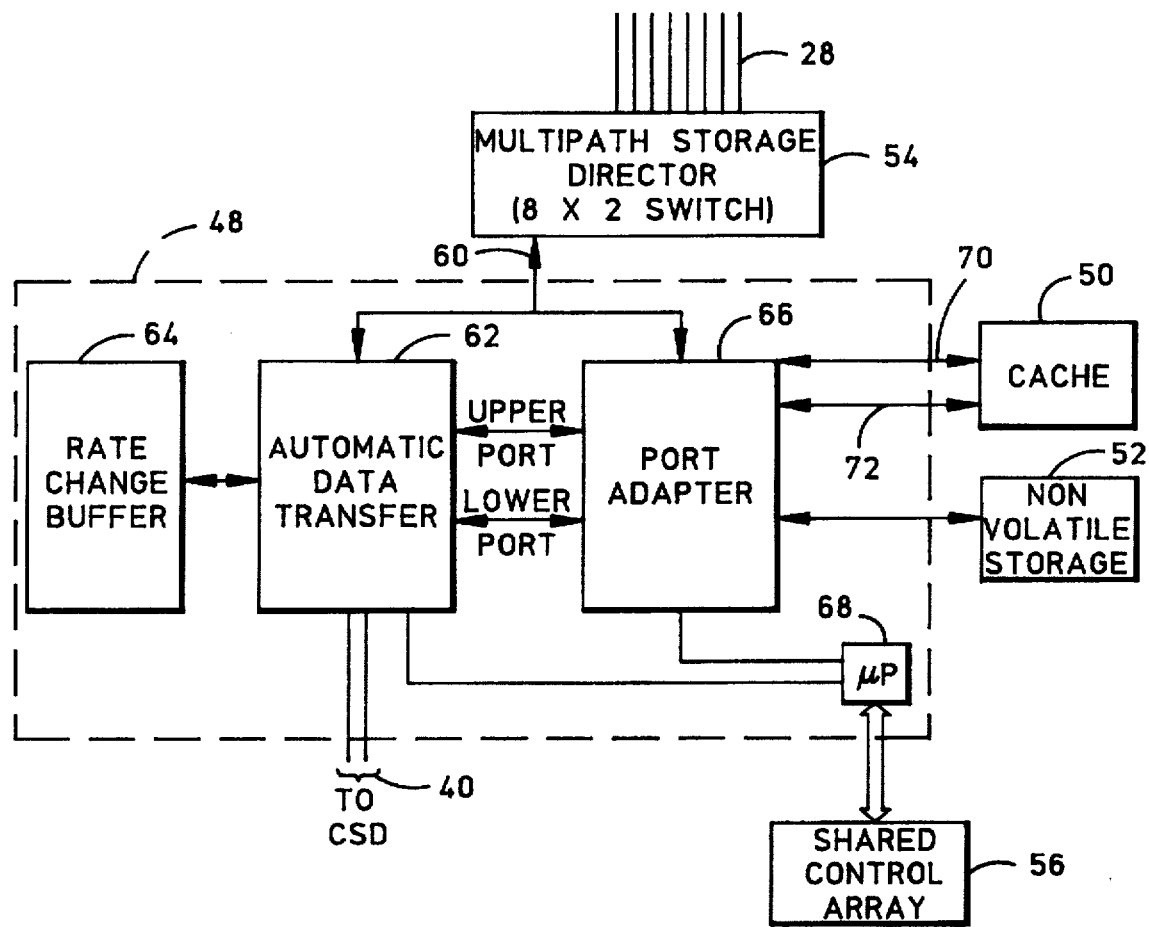
FIG. 3 is a functional block diagram of a storage path processor from the SC of FIG. 2.

FIG. 3 shows storage path processor 48 in more detail. Processor 48 is coupled to multipath storage director 54 by the upper port 60 and to CSD rack 26 by the lower data path 40. Data transfer between multipath storage director 54 and a logical DASD store in CSD rack 26 is synchronized in an automatic data transfer circuit 62, which is supported by a rate change buffer 64 as necessary. Rate-change buffer 64 compensates for data transfer speed differences between CSD rack 26 and host channel 28, which is usually faster. A port adapter 66 controls data transfers between CCM 50, nonvolatile store 52 and data path 40. Port adapter 66 also controls data transfers between CCM 50 and upper port 60. CCM 50 and nonvolatile store 52 operate in part to provide logical completion of addressed data write requests without awaiting physical synchronization of associated rotating storage disks. All operations of storage path processor 48 are controlled by a microprocessor 68. CCM 50 has two ports 70 and 72. Port 70 is coupled through port adapter 66 to upper port 60 and port 72 is coupled through port adapter 66 and automatic data transfer circuit 62 to data path 40. Port adapter 66 is coupled through two ports to automatic data transfer circuit 62, thereby permitting simultaneous data flow from either upper port 60 or data path 40 through the associated elements of storage path processor 48 to CCM 50.

Figure 4:
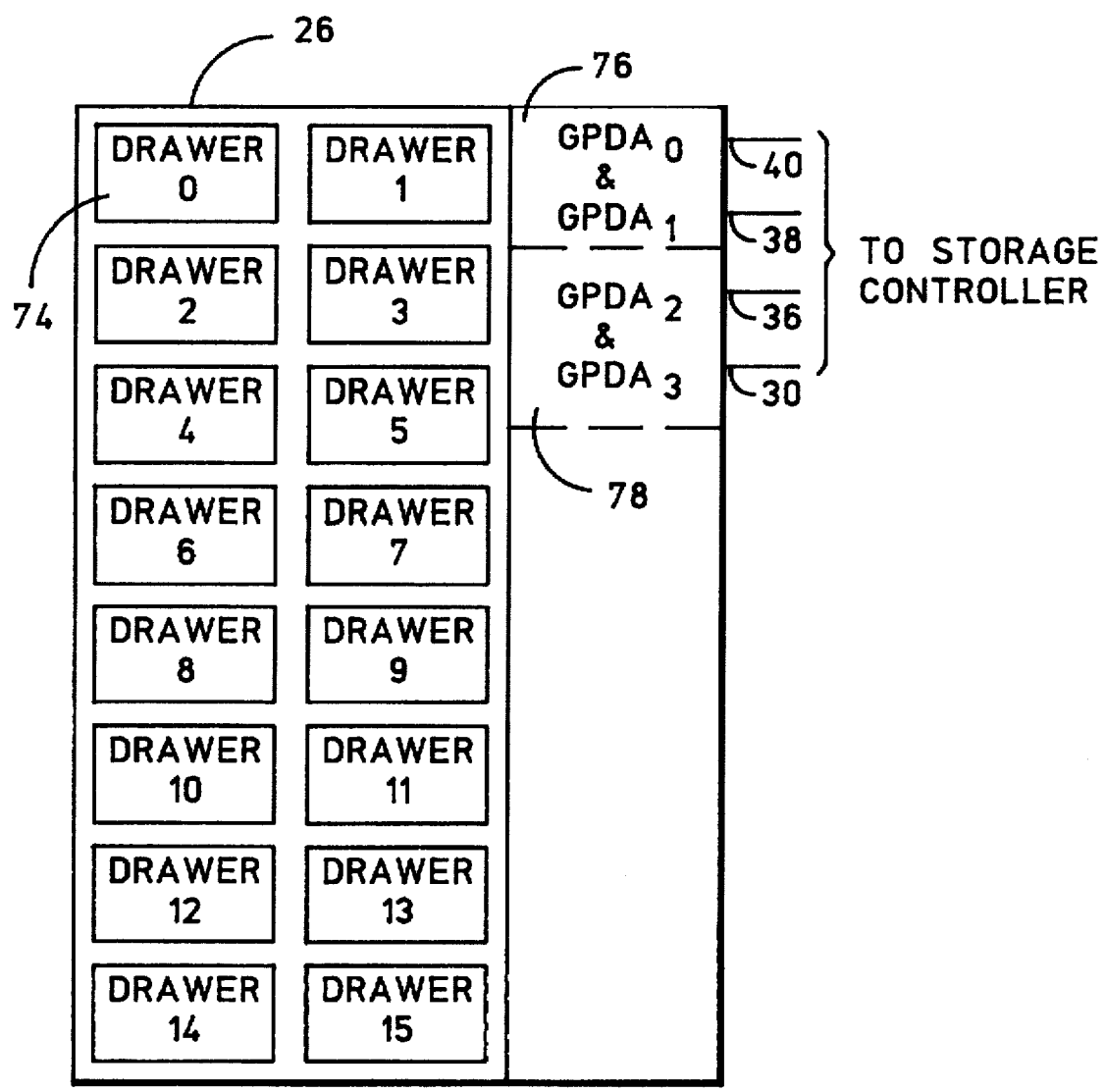
FIG. 4 is a sketch showing sixteen Cached Storage Drawers (CSDs) disposed in a single Direct Access Storage Device (DASD) storage subsystem rack.

FIG. 4 provides a simple organizational schematic illustration of CSD rack 26. Rack 26 includes 16 CSDs exemplified by CSD 74. Each of the 16 CSDs are coupled to two GPDA interface circuits 76 and 78, each of which supports two of the four data paths 30, 36–40. Each of these elements is shown in additional detail in FIG. 5.

Figure 5:
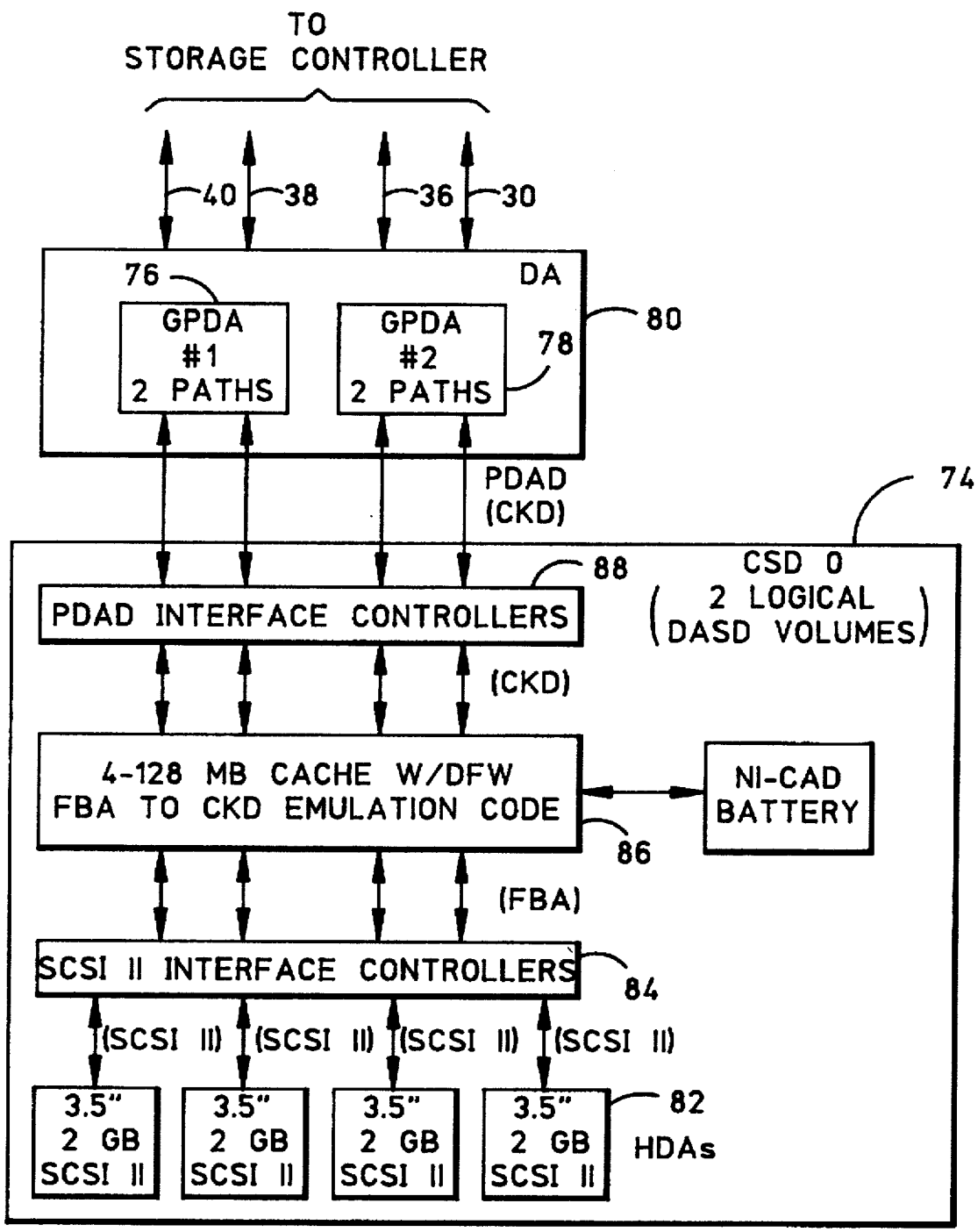
FIG. 5 is a functional block diagram of one CSD from the system of FIG. 1.

FIG. 5 shows a functional representation of CSD 74 coupled through GPDA interface circuits 76–78 to data paths 30, 36–40. GPDA assembly 80 operates as a data switch that connects selected ones of the 16 CSDs in CSD rack 26 to the four data paths 30, 36–40. Although, for illustrative purposes, assembly 80 is shown connected only to CSD 74, up to four different logical DASDs at a time in various CSDs may be logically connected by assembly 80 to data paths 30, 36–40. CSD 74 includes four Head-Disk Assemblies (HDAs) exemplified by HDA 82. Each HDA is coupled to a SCSI-II interface 84 in the well-known manner and therefrom to the Drawer Cache Memory (DCM) 86. Like the CCM 50 discussed above in connection with FIG. 3, DCM 86 includes dual-ported modules permitting data flow between the HDA plurality through interface 84 and also data flow upward through the PDAD interface 88 and GPDA assembly 80 to storage controller 24. DCM 86 functions similarly to CCM 50, "staging" data blocks up from the HDA plurality so that addressed data requests from storage controller 24 can be serviced without waiting on disk positioning in the mechanical HDAs. Also, although not relevant to the description of this invention, DCM 86 provides data format translation and emulation between Fixed Block Architecture (FBA) and Count-Key Data (CKD) record formats. In the exemplary embodiment shown in FIG. 5, the four HDAs exemplified by HDA 82 are organized to present two logical DASD storage volumes to storage controller 24. Thus, up to two simultaneous logically independent addressed data requests may be presented to CSD 74. Also, the HDA plurality is preferably organized as a RAID (Redundant Array of Inexpensive Disks) for fault tolerance. RAID theory is described by Patterson et al. "A Case for Redundant Arrays of Inexpensive Disks", Proc. ACM SIGMOD Conf., Chicago, Ill., June 1988) and is not particularly relevant to the description of this invention.

Each CSD in rack 26 contains a large fast DCM (from 4 to 128 MB of RAM per drawer) that is used to upstage and downstage data blocks (usually in track increments) between storage controller 24 and the RAID hardware within the particular drawer, creating much unnecessary duplication of the cached data blocks occurs in both DCM 86 and CCM 50. This can be understood by considering a simplified example of a typical read operation. Referring to FIG. 1, host computer system 22 submits a "read request" over host channel 28 to storage controller 24. Storage controller 24 searches CCM 50 (FIGS. 2–3) to find the particular data addressed by the read request. When these data are not found, storage controller 24 calculates the precise CSD housing the logical DASD store in which the requested data can be found and passes this information along with the read request to CSD rack 26. When assembly 80 (FIG. 5) receives the read request and logical DASD information, it connects with the appropriate CSD (for instance, CSD 74) and looks for the data in DCM 86. If the data are not found in DCM 86, it is upstaged from the physical HDAs in track increments and stored in DCM 86. After the data are found in DCM 86, they are retrieved and passed back up to storage controller 24 where they are stored in CCM 50. After storage in CCM 50, storage controller 24 quickly services the read request on one of the host channels back to the host computer system 22. It should be readily apparent that this process always produces two cached copies of the data tracks or blocks containing the data addressed by the read request. One of these copies remains in DCM 86 and the other remains in CCM 50.

A similar situation occurs with addressed data write requests, which can be better understood with the reference to the following discussion of cache write operations. In the usual caching system, there are three different cache modes of interest: read-only caching, DASD fast-write operations and cache fast-write operations. Read-only caching is a prerequisite for both the DASD and cache fast-write operations. With read-only caching, only read requests are serviced from CCM 50. With DASD fast-write and cache fast-write operations, CCM 50 also assists in servicing write-requests received on host channel 28. The overall interaction between the two cache memories, DCM 86 and CCM 50, can be better understood with a brief review of well-known cache memory operating principles, which is now presented.

For read-only caching, if a copy of the block containing the addressed data is in the cache when the read request is received, it is herein said to constitute a "read hit" on the cache and the storage control transfers the desired data from the cache memory to the channel. If a copy of the block containing the addressed data is not in the cache, it is herein denominated a "read miss" and the storage control then sends the requested data directly to the channel from the underlying storage device and, at the same time, writes the same data together with the remainder of the data block and track into the cache memory for anticipated future use. Future requests for records that follow in sequence from the initial requested data for that block are then read from the cache as "read hits".

In basic write-caching operations, if a copy of the block or track containing the addressed data is in the cache when a write request is received, it is herein said to constitute a "write hit" and the storage control writes the data directly to CSD 74 and, at the same time, writes the same data into the cache memory. This updates the record already existing in cache so that it can be referred to again. However, before the storage control can signal the completion of the operation, successful "destaging" of the record to HDA 82 must be confirmed. The record is simultaneously written to the cache memory and to the underlying storage device (such as CSD 74), with the "device end" signal returned at completion. Writing to CSD 74 ensures data integrity because copies in CCM 50 and CSD 74 are identical.

When the record being updated is not found in the cache memory, the condition is herein denominated a "write miss" and the record is written directly to the underlying data store and is not written to the cache in the basic write caching operation. However, for the fast-write operations, the record may be also be written to the cache.

The cache management procedures for both DASD and cache fast-write functions are the same. They differ in the way that they are invoked and in the fact that the DASD fast-write also uses a nonvolatile store (such as NVS 52) to provide protection against power failures, but both operations process read and write hits and misses in the same manner.

Most write operations are "write hits" because typical applications first read a record before updating it or the write operation itself creates a new record, referred to herein as a "format write". In a format write operation, the new record is written and the remainder of the block or track is formatted for new data. Thus, there is no need to verify the data on the track before allowing the cache write. Format writes are considered cache hits. For either DASD or cache fast-write operations, if a copy of the addressed data is not in the cache when the write request is received or if the operation is not a format write, the storage control writes the data both to the cache memory and the underlying storage device and the remainder of the track is staged up into the cache from the storage device. For DASD fast-write, all write hits from the host channel to the cache memory are also stored in a nonvolatile store.

DASD fast-write improves storage subsystem performance because immediate access to the underlying storage device (e.g., CSD 74) is not required for write hits and full-track format writes. DASD fast-write hit operations store data simultaneously in cache and in NVS without modification to the application and are transparent to the user. Access to the underlying data stores is not required to complete the DASD fast-write operation for write hits. Because a copy of the addressed data is stored in NVS, the storage director returns channel-end and device-end status signals together at the end of the data transfer to cache and NVS. This allows the host system to continue processing without waiting for the data to be destaged to the underlying store. The data remain in cache and in nonvolatile storage until destaged to logical DASD to free space in the cache or NVS. Most write operations operate directly with the cache without going to the underlying DASD, resulting in the same performance as a read hit operation.

Cache fast-write is an option designed for use with special kinds of data, such as temporary data created as a work file. For certain applications, intermediate work files are kept temporarily in the cache memory and the data may not be written to the underlying data store. The channel program is completely satisfied when the data is written to cache alone and does not require storage in NVS.

The above general discussion of caching operations applies both to CCM 50 (FIG. 3) and DCM 86 (FIG. 5) except that DCM 86 is entirely non-volatile and thus does not employ the cache-write and fast-write procedures. The following general discussion of caching algorithms also applies to both CCM 50 and DCM 86.

Several caching algorithms determine how the cache is managed for a specific type of operation. Typical caching algorithms include normal, sequential, by-pass cache and inhibit cache loading. Such algorithms are used for the duration of a single input/output request.

The cache memory uses normal caching algorithms unless directed otherwise by software. Normal caching stages to the cache data that are addressed in a read request and which remain in the cache memory until least-recently-used (LRU) algorithms permit them to be overlaid by other data. Normal caching applies to both read operations and both types of fast-write operations.

Both the DCM 86 and the CCM 50 maintain both a LRU list and a Freelist for track addresses. Data track addresses containing no modified data (that is, any modified data that have already been committed to the underlying data store) that are at the bottom of the LRU list are shifted to the top of the Freelist so long as the number of data tracks on the Freelist does not exceed a defined constant (m). The cache memory allocates track slots or bins from the bottom of the Freelist. For simplicity, the Freelist may be considered merely as the track address that is "m" positions from the bottom of a long LRU list. Thus, although a track is on the "Freelist", it may continue to be referenced as a cache hit (and thereby promoted to the top of the LRU list) until it is reallocated to a new domain. A track with modified data that are destaged from DCM 86 is not normally purged from the DCM 86 but instead retains its place on the DCM LRU list (it was promoted to top priority when accessed by the write request).

Sequential access methods are best implemented using sequential caching algorithms. Sequential caching employs a sequential procedure that attempts to stay ahead of the host requests for reads while demoting from cache the sequentially staged data behind the host requests. For instance, during sequential caching, anticipated data can be prestaged so that a plurality of sequential tracks are stored in cache simultaneously. A sequential limiting procedure permits only a limited plurality of tracks to reside in cache memory for each domain. A bypass-cache procedure does not use the cache memory and refers the input/output requests directly to the underlying data store. An inhibit cache loading procedure uses existing copies of data blocks if they are found in cache memory but does not load any new tracks into the cache memory. The purpose of this mode is to avoid the overhead arising from track promotion when there is no benefit, such as whenever these tracks are not likely to be again accessed in the near future.

As can be appreciated from the above general discussion of cache operations, the cache operations known in the art are not intended to manage the dual-hierarchy created by coupling CSD rack 26 to storage controller 24. However, by adding the elements of this invention to the usual cache operating procedures, a new hierarchical cache operating method of this invention has been developed as now described.

In the existing system, when cache controller 24 experiences a cache miss, it accesses CSD rack 26 with a "Set Domain Request" for the data addressed by the I/O request. If these data are already in DCM 86, the Set Domain Request then rapidly raises the Record Ready Line to storage controller 24, which then reconnects to CSD 74 and stages the requested tracks from DCM 86 to CCM 50. If the requested tracks are not in DCM 86, CSD 74 then stages the tracks up from the HDA plurality into DCM 86, and when enough data are in DCM 86 to prevent underruns, CSD 74 then raises the Record Ready Line to storage controller 24. This latter situation is a "drawer access miss". In all cases, storage controller 24 disconnects immediately from CSD rack 26 to await Record Ready without waiting to confirm a drawer cache miss. In either case, once the data are staged to CCM 50 from DCM 86, these tracks then reside in both cache memories and represent duplicate cached data.

The procedure of this invention introduces three new elements to accommodate this DCM-CCM cache hierarchy. These are the "Quick-Select" procedure, the "Pre-notify Intent" procedure and the "Conditional Purge" procedure. These three elements interact synergistically and are now described.

The Quick-Select procedure revises the storage controller access of CSD rack 26 so that, for any drawer access, whether with read or write intent, CSD 74 remains connected to host channel 28 (selected) if the requested data are already in DCM 86, and data transfer begins immediately after connection of storage controller 24 to host channel 28, without waiting for "selection" of CSD 26. The exact type of data transferred depends on the intent of the Set Domain Request. For drawer read hits, the data are staged both to CCM 50 and directly to host channel 28 in a "branching stage" for cache I/O, otherwise, the data are staged directly to host channel 28. Before a DASD or cache fast-write Set Domain Request, the data are stored in DCM 86 and forwarded to CCM 50. Thus, a read or write hit to DCM 86 results in a high performance data transfer that avoids delays arising from deselection of CSD rack 26 from host channel 28. Otherwise, storage controller 24 deselects CSD 74 and the requested data are staged within CSD 74 to DCM 86 from the corresponding HDAs. For reads or writes, once enough data are in the drawer to service SC 24 without underruns, the record-ready interrupt is raised by CSD 34. As used herein, a "selection" refers to a logical connection between the drawer and the storage controller while a "connection" refers to a logical connection between the host channel and the storage controller.

The Pre-notify Intent and Conditional Purge parameters of this invention are included in the Set Domain Request (SDR) from storage controller 24 to CSD rack 26. The Pre-notify Intent parameter, when coupled with the read or write intent parameter already used in the SDR, instructs CSD 74 to stage specified data blocks into DCM 86 from the underlying HDAs. This specified domain is usually a number of contiguous tracks. With the pre-notify intent parameter, the Record Ready Line is not raised when the staging to DCM 86 begins. In other words, SC 24 issues the pre-notify intent command to CSD 74 and then disconnects from CSD 74 under the implicit assumption that the necessary staging to DCM 86 will be completed without notice to SC 24.

The Conditional Purge parameter is also included in the Set Domain Request and instructs CSD 74 to place the specified domain (contiguous track address) at the top of the DCM 86 freelist after completion of domain upstaging to CCM 50 provided that the activity level of the HDAs comprising the logical target volumes is below a given threshold. This represents a "conditional purge" of the specified domain from the LRU list for the drawer cache memory 86. If the HDA activity is above the given threshold, the Conditional Purge parameter is ignored and the specified domain is placed at the Most Recently Used position on the DCM LRU list (that is, the highest-priority position instead of the lowest-priority position).

As used herein, HDA activity level is defined as the moving average ratio of HDA access time divided by total elapsed time for the particular HDA. For instance, if a HDA is accessed for 15 milliseconds cumulatively over the past 100 milliseconds, the HDA activity index is equal to 15 percent. The value of the HDA utilization threshold employed by the method of this invention is determined empirically and the inventors have found a threshold of 30 percent to be useful.

This invention is most useful for improving cache duplication arising from nonsequential CCM read misses. Sequential read and write requests are those with "sequential mode" set in the Defined Extent parameter and "sequential intent" set in the Set Domain Request. Sequential requests are not affected by the procedures of this invention because the requested data are already "sequentially limited" in both the CCM 50 and DCM 86 and therefore do not consume inordinate cache memory space in either. As used herein, "sequential limiting" means that the address of track (n–1) of the same domain is demoted to the bottom of the LRU list responsive to access of data in track (n) in the cache memory. This procedure demotes the previous track or block on the assumption that, in sequential access requests, the previous block will not soon be required. Thus, further limiting of cache duplication has little merit.

Nonsequential read and write requests are treated differently by the process of this invention. For nonsequential write requests, SC 24 write requests to CSD 74, whether nonfast write, DASD fast-write or cache fast-write operations, each require a Set Domain Request with "write intent" set, but without the Conditional Purge parameter of this invention. The specified domain tracks must be resident in DCM 86 for servicing the subsequent destagings from SC 24. The Set Domain Request defines the domain to be upstaged from the corresponding HDAs to DCM 86 and also notifies interface 88 to make a copy of the data tracks and to stage the associated RAID parity tracks so that the RAID parity update can be executed at SC commit time. In view of these operations, the method of this invention does not attempt to eliminate duplicate cache memory entries because such elimination is globally unproductive.

For DASD fast-write and cache fast-write operations, SC 24 uses a store and forward algorithm. At destage time, the SC destage to the CSD is followed by a Commit Request that causes all of the modified data in DCM 86 to be destaged to the associated HDAs. Upon receiving clean cache memory status from CSD for the commit operation, the deleted data are demoted and purged from NVS. The cache data copy retains its LRU priority. In the case of DASD fast-write, a LRU demotion of the track images frequently follows destaging to HDAs and, if the demotion occurs, the only copy of the destaged tracks remaining in the system will reside in DCM 86. Thus, conditionally purging these images would be counterproductive because it creates a firm requirement for subsequent restaging of the same track images to DCM 86, thereby unnecessarily increasing the activity level of the underlying HDAs. In the case of a cache fast-write operation, a LRU destage occurs in CCM 50, eliminating the track image from CCM 50 and leading to the same requirement for retaining the DCM track image as the only remaining copy in cache.

For non-DASD fast-write or non-cache fast-write requests (usually rare), the CCM 50 destage to DCM 86 is followed by further destaging to the underlying HDAs, which occurs after every CKD write or after every Locate Record/Locate Record Extended set of ECKD write requests. CSD 74 then contains the only nonvolatile cache copy of the track images, although storage controller 24 may also have a volatile copy of the track image. Therefore, because the track in question may receive additional write requests, the destaged tracks are not demoted in DCM 86 LRU priority, thereby avoiding possible restaging of the same tracks from the underlying HDAs back to DCM 86 responsive to new write requests.

Thus, the most important improvements available from the method of this invention are seen for non-sequential read requests that "miss" controller cache memory 50. The method of this invention provides four important features related to non-sequential CCM read misses.

The first feature is the production of a Set Domain Request with "read intent" and "Conditional Purge mode" by SC 24 responsive to a non-sequential read miss in CCM 50. This SDR is transmitted to CSD 74, which responds by staging the specified domain into DCM 86 from the underlying HDAs. The CSD staging procedure differs between ECKD and CKD, depending on a parameter in the SDR, but this variation does not affect the method of this invention.

The second feature is that, whether DCM 86 sustains a read hit or read miss, once the stage into CCM 50 is completed, CSD 74 activates the Conditional Purge procedure of this invention, which demotes the specified domain to the top of the Freelist "m" positions above the bottom of the global DCM LRU list) provided that the relevant HDA activity thresholds are not exceeded. If a track on the Freelist is not again referenced, the cache entry is quickly allocated to a new domain, whereupon the duplicate (DCM) cache copy of the track is removed from the DCM-CCM dual-cache hierarchy. Thus, by this method, additional DCM space is quickly made available for non-duplicate data. Note that if the HDA activity thresholds are exceeded, the Conditional Purge process is not executed and the duplicate track copy retains its DCM LRU list priority in the usual fashion.

The third feature is that when the storage controller 24 demotes a track in CCM LRU priority that was first staged to CCM 50 responsive to a CCM read-miss, storage controller 24 preserves a single copy of the track in DCM 86 by issuing a Set Domain Request with read intent and Pre-notify Intent to CSD 74. Responsive to this Pre-notify SDR, CSD 74 stages the full track in question into DCM 86 from the underlying HDAs, thereby replacing the copy originally purged from DCM 86 in anticipation of purging of the same track image from CCM 50. After issuing the pre-notify SDR, storage controller 24 deselects (disconnects) from CSD 74 and does not wait for a Record Ready signal, nor is any response sent from CSD 74 to indicate the prestaging to DCM 86 (without errors). In such case, the Conditional Purge mode is not set in the SDR, simply because the new track image in DCM 86 is no longer treated as a duplicate of the track image in CCM 50. The result of this operation is that a single cached copy of the track continues to exist, although its location is now altered to DCM 86 from CCM 50. If a request for data in the track image is received before it drops out of DCM 86 from disuse, CSD 74 then can rapidly service the request responsive to a storage controller cache miss. Note that if the HDA activity thresholds are exceeded, the Pre-notify procedure is not executed and the demoted track is not restaged to DCM 86.

Finally, the fourth feature is the restaging of the DCM track image responsive to a fast-write hit in storage controller cache memory 50. Upon the first DASD or cache fast-write hit to a track staged into CCM 50 as a result of a non-sequential CCM read miss, storage controller 24 issues a Set Domain Request that includes write intent and Pre-notify intent to CSD 74. This Pre-notify SDR causes CSD 74 to prepare for the destage from CCM 50 that is expected to follow at a later time. This preparation includes the prestaging of parity data into DCM 86 (for RAID purposes) and the creation of a second copy of the data track in DCM 86. The Conditional Purge mode is not set in the SDR for these write requests and HDA activity thresholds are ignored because the track must be staged to DCM 86 in preparation for a subsequent SC 24 destage regardless of HDA activity levels.

The above discussion of the features of the method of this invention is now expanded and illustrated in connection with FIGS. 6–10.

Figure 6:
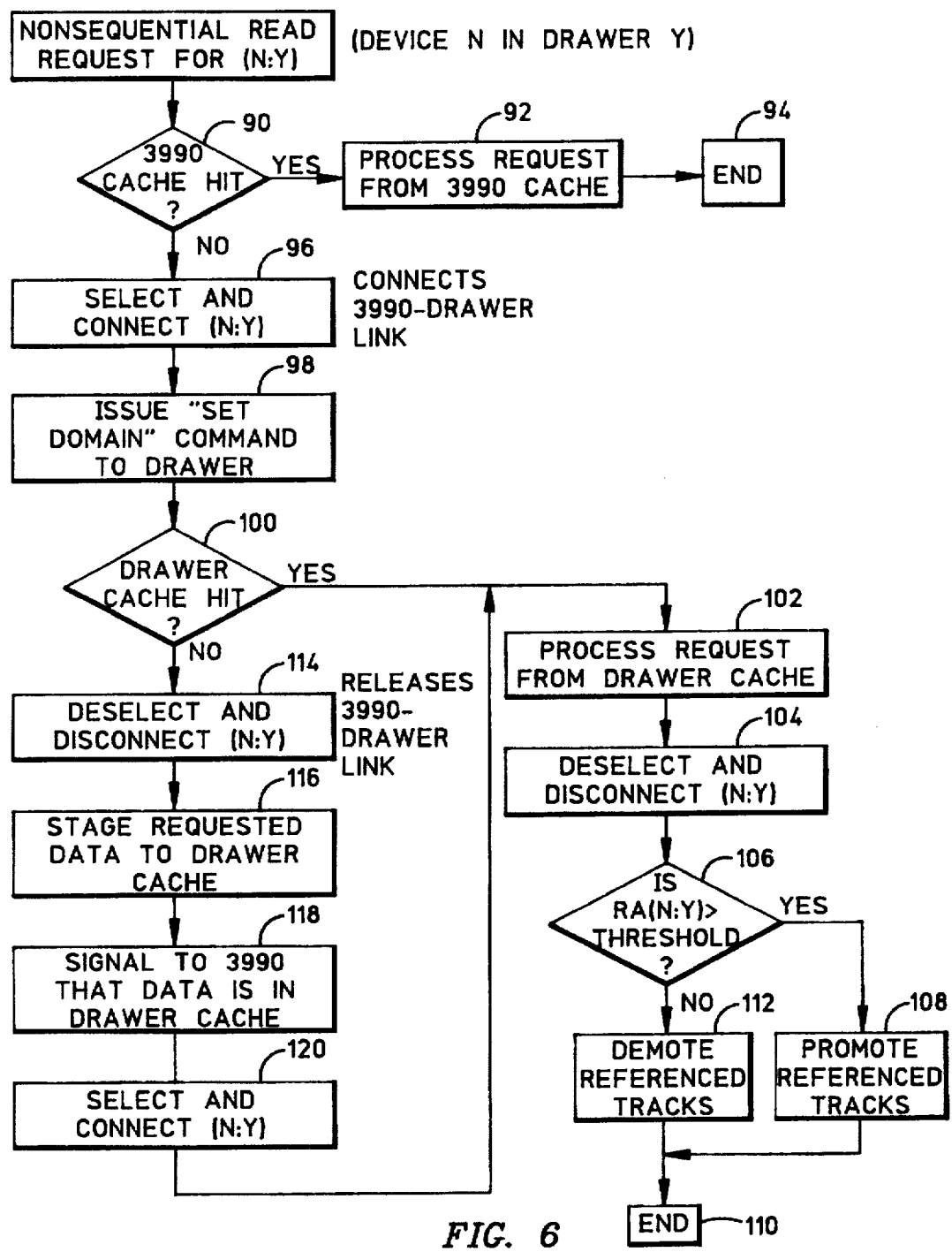
FIG. 6 is a functional block diagram showing the "Quick-Select" and the "Conditional Purge" procedures of this invention.

FIG. 6 provides a flow chart illustrating the treatment of a non-sequential read request from host channel 28 specifying a domain located on logical device "N" in CSD "Y". In FIG. 6, the non-sequential read request is first tested for a hit in controller cache memory at step 90. If the request can be serviced from CCM 50, the request is processed in step 92 and the procedure ends at 94. If the request is a storage controller read miss, then storage controller 24 selects and connects to the CSD containing the logical device (N:Y) at step 96. A Set Domain Command is issued to drawer Y at step 98, which tests at step 100 to determine if the addressed data is available in DCM 86. If the request results in a drawer cache memory hit, it is processed from DCM 86 at step 102 and storage controller 24 then disconnects from the drawer at step 104, which ends the procedure for the storage controller. However, at step 106, the CSD continues with the Conditional Purge procedure. First, at step 106, the activity level RA(N:Y) is tested against a fixed threshold. If the activity level exceeds the threshold, the referenced tracks are promoted to the top of the DCM LRU list in the usual manner at step 108 and the procedure ends at step 110. Only if the associated activity level RA(N:Y) is less than the predetermined threshold are the referenced tracks demoted to the Freelist at step 112, which constitutes the "Conditional Purge" of the duplicate track image discussed above.

Returning to step 100, if the read request represents a DCM miss, the connection between storage controller 24 and CSD 74 is terminated at step 114 to permit the storage controller to continue with other business while awaiting upstaging of the requested data from the underlying HDA plurality to the drawer cache memory in step 116. After completion of a sufficient amount of upstaging data transfer in CSD, the Record Ready line is raised at step 118 to signal the storage controller that the requested data is now quickly available in DCM 86. Responsive to the Record Ready signal, storage controller 24 again selects and connects to CSD at step 120 and proceeds to step 102 discussed above. The procedure in FIG. 6 illustrates both the Quick-Select feature of this invention (steps 96–104) and the Conditional Purge feature of this invention (steps 106–112).

Figures 7, 8:
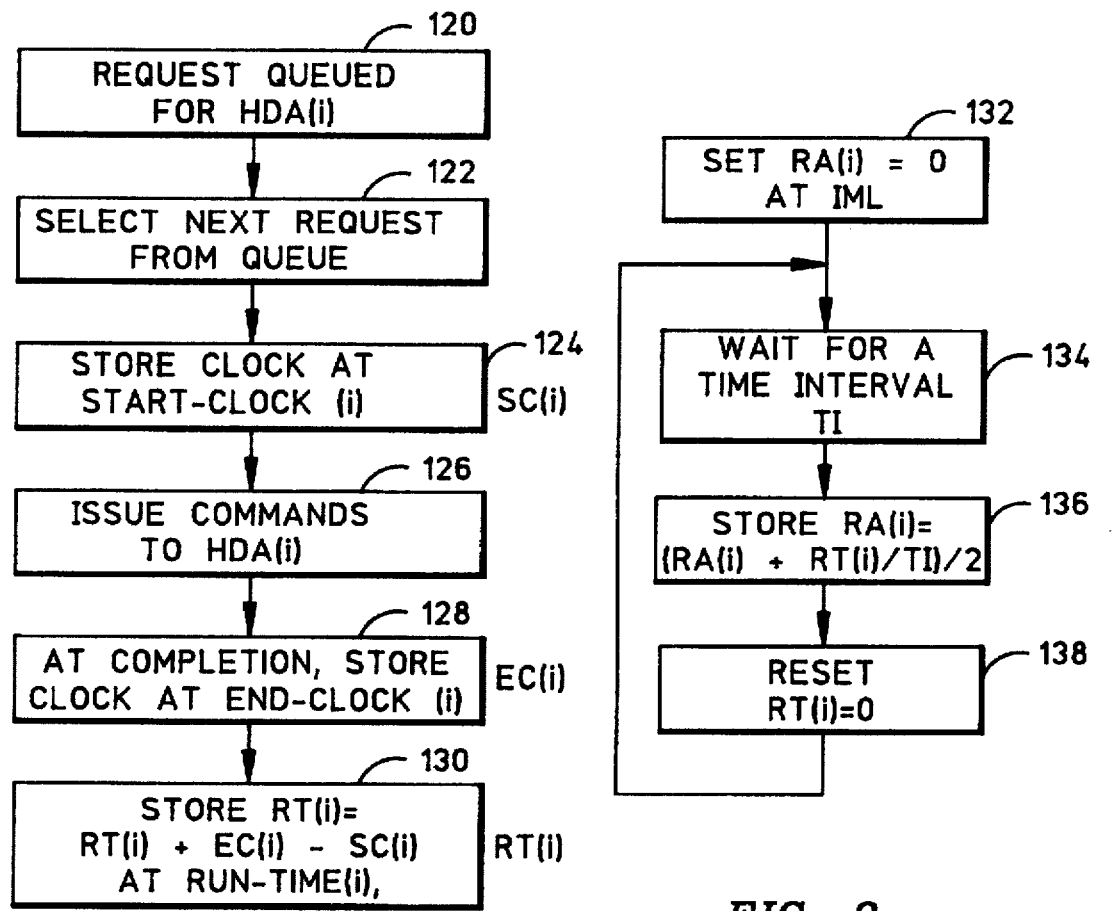
FIG. 7 is a functional block diagram illustrating the hardware activity monitoring method of this invention.
FIG. 8 is a functional block diagram illustrating the hardware duty cycle refresh method of this invention.

FIG. 7 provides a simple flow diagram illustrating an illustrative procedure for tracking the activity level of each HDA within CSD 74. The procedure begins with the queuing of an access request for the $i^{th}$ HDA at step 120. When this request is selected at step 122, a "store-clock" command is executed to store the present clock time at the $i^{th}$ location in a start-clock table ($SC_i$) at step 124. The request is processed at step 126 and, when completed, a second "store-clock" command is executed at step 128 to store the new clock reading at the $i^{th}$ location in an end-clock table ($EC_i$). In step 130, a simple computation of $RT_i = RT_i + EC_i - SC_i$ is performed to update the $i^{th}$ location in a run-time table ($RT_i$).

FIG. 8 provides a simple illustration of the preferred method of computing activity level on a continuing moving-window basis. At Initial Microcode Load (IML), the $i^{th}$ location in a Rate of Access table ($RA_i$) is set to zero at step 132. In step 134, the system waits for time interval TI which represents the "smoothing interval" or the "moving-window" used in generating an average Rate of Access for each HDA. In step 136, the value for $RA_i$ is updated by dividing the new value for $RT_i$ by the time interval TI and averaging the result with the previous value of RA(i). This can be expressed as $RA(i) = ((RA(i) + (RT(i)/TI))/2$. The run-time is then reset to zero at step 138 and the process returns to step 134 in a loop. The combination of the procedures illustrated in FIGS. 7 and 8 provide a continuously-updated value for Rate of Access for each HDA in CSD 74.

Figure 9:
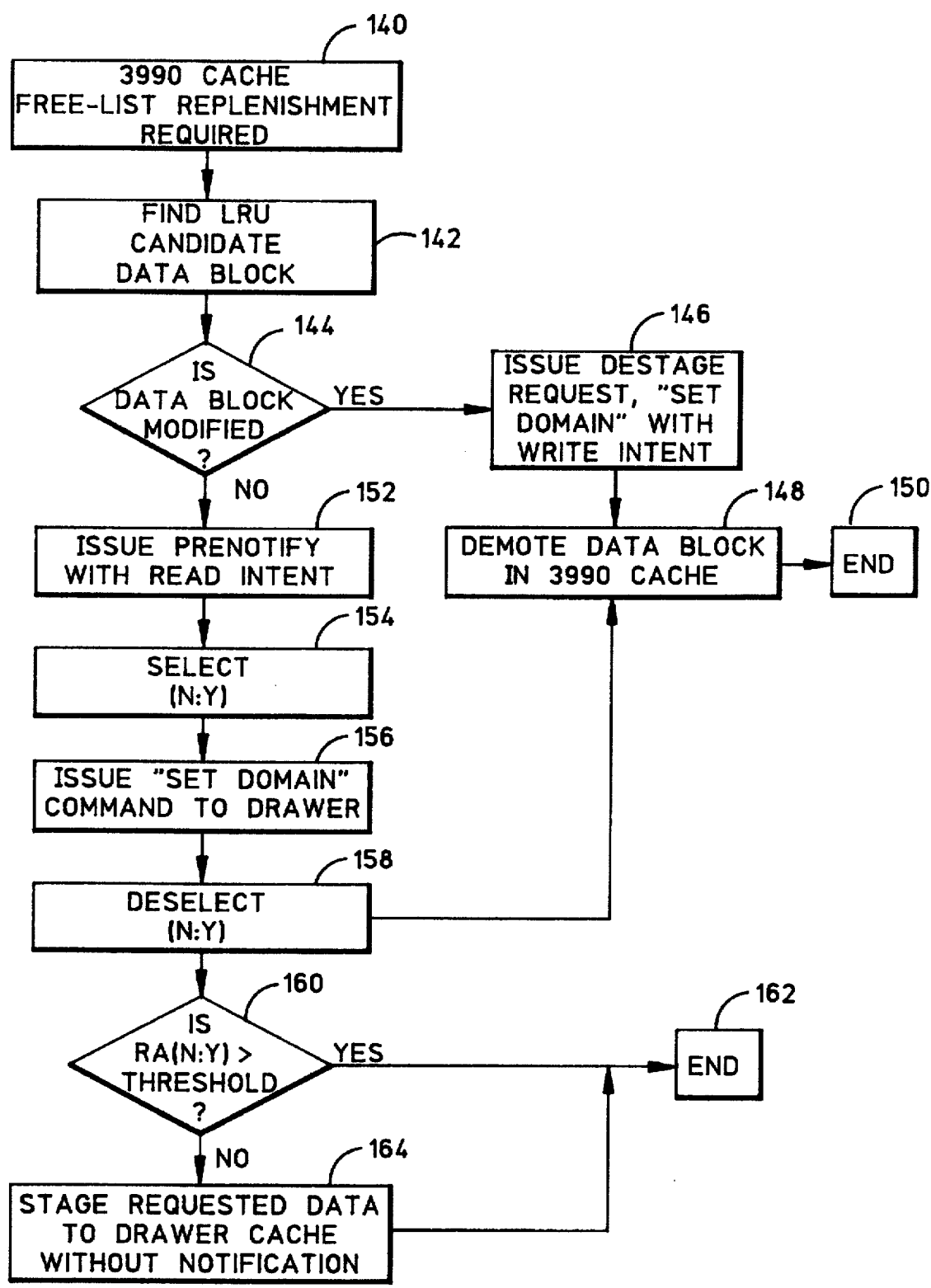
FIG. 9 is a functional block diagram showing the "Pre-notify-Intent" CSD write prestaging method of this invention.

FIG. 9 provides a simple flow chart illustrating the restaging of purged tracks responsive to LRU demotion of the track single-copy in CCM 50. Beginning with step 140, the storage controller cache memory responds to a Freelist replenishment requirement by locating a LRU candidate data block in step 142. In step 144, the candidate data block is tested for modification and, if found to be "dirty", a destage request is generated at step 146. In step 146, the modified data block is destaged to CSD 74 in the usual manner. After destaging, the block is demoted in the CCM LRU list at step 148, recognizing that a copy remains in DCM 86 of CSD 74 because of the recent destaging at step 146. Finally, the procedure ends at step 150.

If the data block is found unmodified at step 144, the storage controller issues a pre-notify with read intent command at step 152. At steps 154–158, the storage controller selects and issues the set domain command to the CSD, and then deselects all in one quick process. The storage controller then proceeds to step 148 discussed above but, after deselection, the CSD tests the activity level of the associated HDAs in step 160. If the Rate of Activity of the target HDA hardware exceeds a predetermined threshold, then the procedure simply ends at step 162. If the activity is below the predetermined threshold, only then is step 164 executed, which stages the requested data into DCM 86 without notification of the storage controller. After step 164, the procedure ends at step 162.

Figure 10:
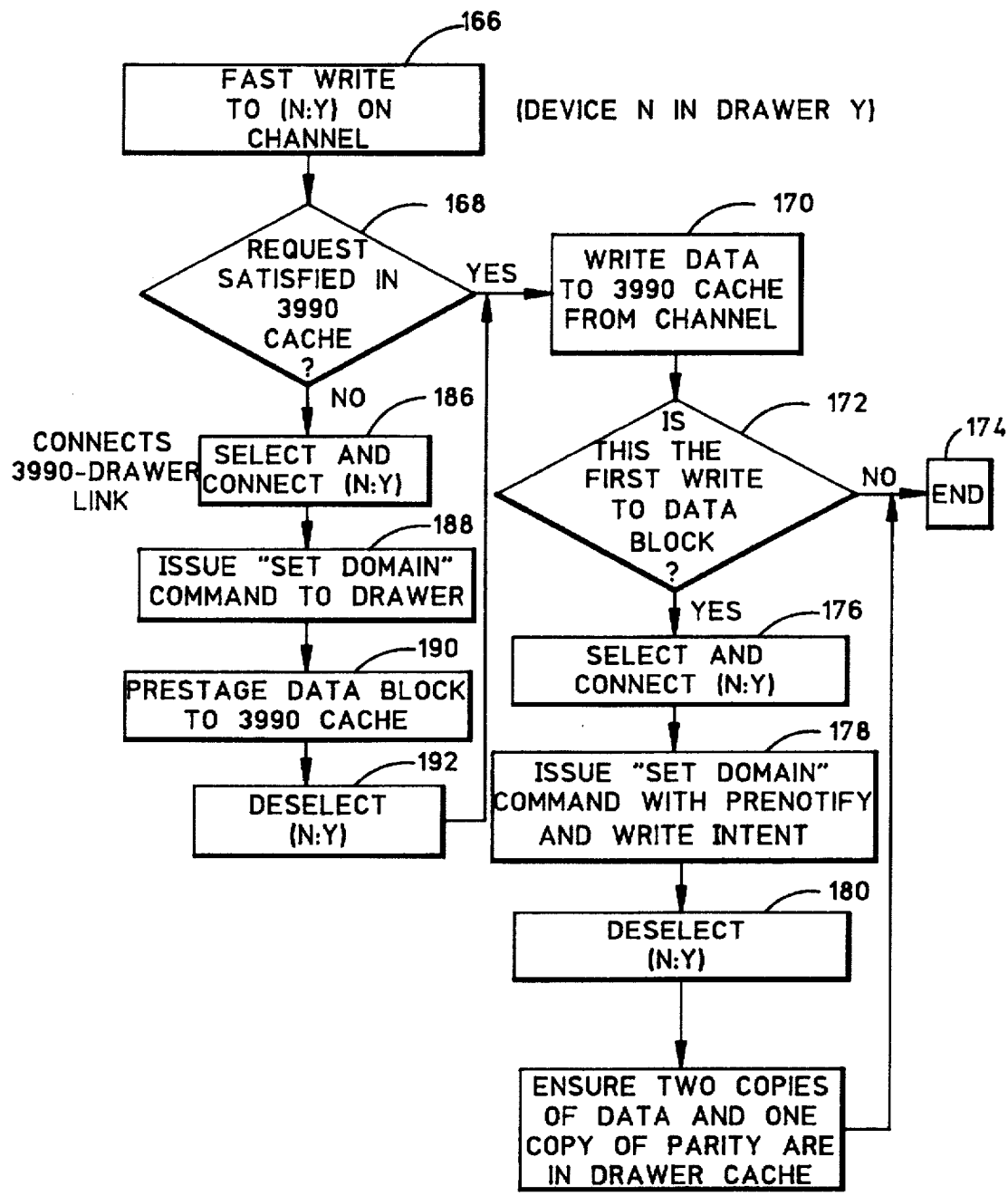
FIG. 10 is a functional block diagram illustrating the "Pre-notify-Intent" SC destaging method of this invention.

FIG. 10 illustrates the preferred procedure for staging to the DCM responsive to a fast-write request on host channel 28. When the fast-write request is received at step 166, it is first tested for satisfaction in the controller cache memory 50 at step 168. If satisfied, the requested data is written to CCM 50 at step 170 and then tested at step 172 to determine if it is the first data written to the particular data block or track. If it is not, the procedure ends at step 174 because pre-notify intent has already been issued to the drawer. If this is the first write to this data block, device "N" in drawer "Y" is selected and connected at step 176, a Set Domain Request is issued with "Pre-notify" and "write intent" at step 178, and the CSD is deselected at step 180. After SC disconnection, the CSD tests for a DCM cache hit and, if the domain is found in DCM 86, step 184 is satisfied the procedure ends at step 174. If the tracks have been deleted earlier from DCM, then the paraity data and a second copy of the data track are restaged from the underlying HDAs in step 184, without notification to storage controller 24, and the procedure ends at step 174. Thus, although the request is satisfied in CCM 50 at step 168, the track images and parity data are prestaged to DCM 86 for expected later destaging from CCM 50.

If the initial request is not satisfied in CCM 50 at step 168, then the storage controller connects to CSD and issues a Set Domain Request at steps 186 and 188. The Set Domain Request causes the CSD to prestage the data block from CSD to CCM 50 in the storage controller at step 190, after which the storage controller deselects the CSD at step 192. SC then proceeds to step 170 to write the addressed data to CCM from the host channel as discussed above. No additional DCM prestaging is required, of course. The procedure in FIG. 10 essentially replaces purged domain copies in DCM in anticipation of a fast-write destaging downward from CCM.

The method of this invention advantageously increases the performance of the combined cache memory subsystems by reducing the duplication of cached data and, therefore, increasing the overall cache memory hit ratios. This invention also advantageously "pushes down" to the drawer cache (through staging from the underlying HDAs) and promotes (by making MRU) in DCM the data demoted from the storage controller cache memory by the storage controller LRU cache algorithm. Note that the alternative to this method would be for the storage controller cache to destage the LRU tracks directly to the CSD. However, this is not a feasible method for several reasons, the principal one being that the underlying HDAs require a FBA record format, which requires that the FBA-formatted track images be available in CSD before the storage controller destaging can occur.

This invention also provides high-speed handling of DCM hits by avoiding the usual immediate storage controller disconnect from the drawer in cases where the requests can be immediately serviced from DCM. Although the method of this invention increases the staging activity from underlying HDAs to DCM and therefore increases the activity level of the underlying HDAs, this is mitigated by asynchronous character of the HDA staging with respect to other storage controller and CSD activity and also by an HDA activity threshold provided by this invention to halt execution of the Conditional Purge and Pre-notify restaging procedures when the underlying HDAs become busy.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. In a data storage system for storing a plurality of addressed data ordered as a sequence of data blocks, said system including a host computer channel coupled to a Storage Controller (SC) having a controller cache memory (CCM) for storing a plurality of said data blocks ordered according to a CCM Least Recently Used (LRU) priority list, wherein said SC is coupled to one or more Cached Storage Drawers (CSDs) each having a plurality of Direct Access Storage Devices (DASDs) coupled to at least one drawer cache memory (DCM) for storing a plurality of said data blocks ordered according to a DCM LRU priority list, a method for transferring addressed data between host computer channel and said plurality of DASDs responsive to an addressed data request from said host computer channel, said method comprising the steps of:

(a) responsive to a read request, transferring said addressed data to the host as a CCM read hit from said CCM if stored therein, otherwise staging to said CCM as a CCM read miss a data block containing said addressed data from the corresponding said DCM and transferring said data block to the host if stored therein, otherwise staging said data block to said corresponding DCM as a DCM read miss from the corresponding said plurality of DASDs and providing said data block to said CCM and then to the host, wherein said data block staging is sequential or nonsequential according to the data addresses contained therein;

(b) responsive to the nonsequential staging of a data block from a DCM to said CCM as a CCM nonsequential read miss, demoting in said DCM said data block to the lowest priority in the corresponding said DCM LRU list;

(c) responsive to the sequential staging of a first data block from a DCM to said CCM as a CCM sequential read miss, demoting in said DCM a second data block sequentially preceding said first data block to the lowest priority in the corresponding said DCM LRU list;

(d) responsive to a write request addressing data contained in a data block stored in said CCM that was staged to said CCM as a CCM nonsequential read miss, restaging to the corresponding said DCM said data block from the corresponding said plurality of DASDs if said data block is not already stored in said corresponding DCM; and (e) responsive to a demotion in CCM LRU priority of a data block that was previously demoted in the corresponding said DCM to the lowest DCM LRU priority after staging to said CCM as a CCM nonsequential read miss, restaging to said corresponding DCM said demoted data block from said plurality of DASDs.

2. The method of claim 1 further comprising the steps of:

(f) determining for each said DASD an activity index representing the ratio of access time to total time averaged over a predetermined time interval; and (g) performing said demoting step (b) only when said activity index is less than a predetermined threshold for each said DASD containing any part of said demoted data block.

3. The method of claim 2 further comprising the step of:

(h) performing said restaging step (e) only when said activity index is less than a predetermined threshold for each said DASD containing any part of said demoted data block.

4. The method of claim 3 wherein said SC creates a data connection to a CSD responsive to a CCM miss and said data connection continues uninterrupted through the staging of said data block from the corresponding said DCM to said CCM if said data block is stored in said corresponding DCM, otherwise said data connection terminates before the staging of said data block from the corresponding said plurality of DASDs to said corresponding DCM.

5. The method of claim 2 wherein said SC creates a data connection to a CSD responsive to a CCM miss and said data connection continues uninterrupted through the staging of said data block from the corresponding said DCM to said CCM if said data block is stored in said corresponding DCM, otherwise said data connection terminates before the staging of said data block from the corresponding said plurality of DASDs to said corresponding DCM.

6. The method of claim 1 further comprising the steps of:
   (f) determining for each said DASD an activity index representing the ratio of access time to total time averaged over a predetermined time interval; and
   (g) performing said restaging step (e) only when said activity index is less than a predetermined threshold for each said DASD containing any part of said demoted data block.

7. The method of claim 1 wherein said SC creates a data connection to a CSD responsive to a CCM miss and said data connection continues uninterrupted through the staging of said data block from the corresponding said DCM to said CCM if said data block is stored in said corresponding DCM, otherwise said data connection terminates before the staging of said data block from the corresponding said plurality of DASDs to said corresponding DCM.

8. A data storage system comprising:
   data storage means;
   a host computer channel for receiving requests each specifying addressed data;
   a Storage Controller (SC) coupled to said host computer channel for controlling data transfers between said host computer channel and said data storage means;
   a controller cache memory (CCM) in said SC for storing a plurality of data blocks ordered according to a CCM Least Recently Used (LRU) priority list;
   at least one Cached Storage Drawer (CSD) in said data storage means coupled to said SC for storing data;
   a plurality of Direct Access Storage Devices (DASDs) in said CSD for storing data;
   a Drawer Cache Memory (DCM) in said CSD coupled to said plurality of DASDs for storing a plurality of data blocks ordered according to a DCM LRU priority list;
   second staging means coupled to said DCM and said plurality of DASDs in said CSD for transferring a data block containing said addressed data to said DCM from said plurality of DASDs responsive to a DCM read miss;
   first staging means coupled to said CCM in said SC and to said DCM in said CSD for transferring a data block containing said addressed data to said CCM from said DCM responsive to CCM read misses and DCM read misses; and
   purging means coupled to said DCM in said CSD for demoting to lowest DCM LRU list priority a data block that is staged to said CCM responsive to a CCM nonsequential read miss.

9. The system of claim 8 further comprising:
   first sequential limiting means in said DCM for demoting a first data block to lowest DCM LRU list priority after a second data block addressed in sequence following said first data block is staged from said DCM to said CCM; and second sequential limiting means in said CCM for demoting a first data block to lowest CCM LRU list priority after addressed data contained in said second data block addressed in sequence following said first data block is transferred from said CCM to said host computer channel.

10. The system of claim 9 further comprising:
write prenotify means in said SC for causing a data block to be staged to said DCM from said plurality of DASDs responsive to a write request addressing data contained in said data block when said data block was earlier staged to said CCM from said CSD responsive to a CCM nonsequential read miss.

11. The system of claim 10 further comprising:
recopy means in said CSD for restaging a data block to said DCM from said plurality of DASDs responsive to demotion in CCM LRU priority of said data block that was earlier staged to said CCM from said CSD responsive to a CCM nonsequential read miss.

12. The system of claim 11 further comprising:
DASD activity monitor means in said CSD for producing for each said DASD an activity index representing the ratio of access time to total elapsed time averaged over a predetermined time interval; and activity threshold means in said CSD for comparing said activity index with a predetermined threshold and for disabling both said purging means and said recopy means when said predetermined threshold is exceeded by said activity index for a DASD containing any part of said demoted data block.

13. The system of claim 8 further comprising:
write prenotify means in said SC for causing a data block to be staged to said DCM from said plurality of DASDs responsive to a write request addressing data contained in said data block when said data block was earlier staged to said CCM from said CSD responsive to a CCM nonsequential read miss.

14. The system of claim 13 further comprising:
recopy means in said CSD for restaging a data block to said DCM from said plurality of DASDs responsive to demotion in CCM LRU priority of said data block that was earlier staged to said CCM from said CSD responsive to a CCM nonsequential read miss.

15. The system of claim 14 further comprising:
DASD activity monitor means in said CSD for producing for each said DASD an activity index representing the ratio of access time to total elapsed time averaged over a predetermined time interval; and activity threshold means in said CSD for comparing said activity index with a predetermined threshold and for disabling both said purging means and said recopy means when said predetermined threshold is exceeded by said activity index for a DASD containing any part of said demoted data block.

16. The system of claim 8 further comprising:
recopy means in said CSD for restaging a data block to said DCM from said plurality of DASDs responsive to demotion in CCM LRU priority of said data block that was earlier staged to said CCM from said CSD responsive to a CCM nonsequential read miss.

17. The system of claim 16 further comprising:
DASD activity monitor means in said CSD for producing for each said DASD an activity index representing the ratio of access time to total elapsed time averaged over a predetermined time interval; and activity threshold means in said CSD for comparing said activity index with a predetermined threshold and for disabling both said purging means and said recopy means when said predetermined threshold is exceeded by said activity index for a DASD containing any part of said demoted data block.

* * * * *

UNITED STATES PATENT AND TRADEMARK OFFICE
CERTIFICATE OF CORRECTION

PATENT NO. : 5,627,990
DATED : May 6, 1997
INVENTOR(S) : Cord, et. al.

It is certified that error appears in the above-indentified patent and that said Letters Patent is hereby corrected as shown below:

Column 1, line 17, change "Modem" to --Modern--.

Signed and Sealed this

Twenty-sixth Day of August, 1997

Attest:

BRUCE LEHMAN

*Attesting Officer*   *Commissioner of Patents and Trademarks*